United States Patent [19]

Hauser et al.

[11] 3,976,415
[45] Aug. 24, 1976

[54] INJECTION MOULDING CONTROL
[75] Inventors: Hans Ulrich Hauser, Niederweningen; Eduard Hartmann, Urdorf, both of Switzerland
[73] Assignee: Bucher-Guyer AG Maschinenfabrik, Niederweningen, Switzerland
[22] Filed: Nov. 5, 1973
[21] Appl. No.: 412,787

[30] Foreign Application Priority Data
Nov. 10, 1972 Switzerland.................... 16381/72

[52] U.S. Cl................................. 425/145; 425/147
[51] Int. Cl.²........................................ B29F 1/06
[58] Field of Search.......... 425/146, 149, 145, 147; 156/378; 264/40, 328

[56] References Cited
UNITED STATES PATENTS

| | | |
|---|---|---|
| 3,213,395 | 10/1965 | Glerum.............................. 336/134 |
| 3,510,915 | 4/1968 | Johansson.......................... 425/147 |
| 3,767,339 | 10/1973 | Hunkar................................ 425/149 |
| 3,773,451 | 7/1975 | Bielfeldt et al....................... 425/147 |
| 3,810,728 | 9/1972 | Jacobs................................ 425/147 |

Primary Examiner—Francis S. Husar
Assistant Examiner—Robert J. Charvat
Attorney, Agent, or Firm—Toren, McGeady and Stanger

[57] ABSTRACT

An injection moulding machine used in conjunction with a closed split mould, has its shot volume controlled by a device which responds to widening of the mould parting line occurring when the mould is completely filled with moulding material as a result of the pressure build up which occurs inside the mould. Contactless sensing of widening of the parting line is described, by means of electromagnetic sensing devices. The shot volume can thus be held at the optimum value at which minimum flash occurs and complete filling of the mould is assured.

7 Claims, 3 Drawing Figures 3,976,415

INJECTION MOULDING CONTROL

FIELD OF THE INVENTION

The invention relates to the control of an injection moulding machine to maintain a substantially constant shot volume in the injection mould.

BACKGROUND TO THE INVENTION

The quality of the mouldings depends largely on the filling ratio of an injection mould. The filling ratio is defined by the shot capacity and this in turn depends on the metered volume and the injection pressure. Disturbing factors such as differences in the consistency of the moulding material or temperature fluctuations in the plasticizing chamber of the moulding machine or in the mould affect the metered volume and thus the filling ratio and mould quality.

OBJECT OF THE INVENTION

The object of the invention is to improve the stabilization of quality of the mouldings when an injection moulding machine is operated under fully automatic conditions.

THE INVENTION

In accordance with one aspect of this invention there is provided a method of controlling shot volume of an injection moulding machine when the mould is filled, comprising sensing distortion of a part influenced by build up of back pressure in the mould occurring when it is completely filled with moulding material, and using such sensed distortion to control the volume of the shot of moulding material injected into the mould by the machine.

In accordance with a second aspect of the invention there is provided an injection moulding machine control system having a sensor responsive to elastic deformation of a part influenced directly or indirectly by pressure build up in the mould occurring when it is completely filled with moulding material, and a regulating system for controlling shot volume in accordance with the output of the sensor.

PREFERRED FEATURED OF THE INVENTION

Preferably the control system operates to regulate the shot capacity in dependence upon the mould parting gap. This is particularly advantageous when the moulding machine operates fully automatically.

The formation of flash which occurs in the mould parting line between two mould halves is a measure indicating complete filling of the injection mould. Material flash results from a mould parting gap which is formed in a mould parting line under the effect of the pressure of the moulding material in the injection mould, due to a certain amount of elastic deformation of the mould supports or by slight opening of the mould.

The invention will now be described in more detail, by way of examples, with reference to the accompanying drawings, in which:

IN THE DRAWINGS

In the accompanying drawings parts corresponding in function are similarly referenced.

PREFERRED EMBODIMENT

Figure 1:
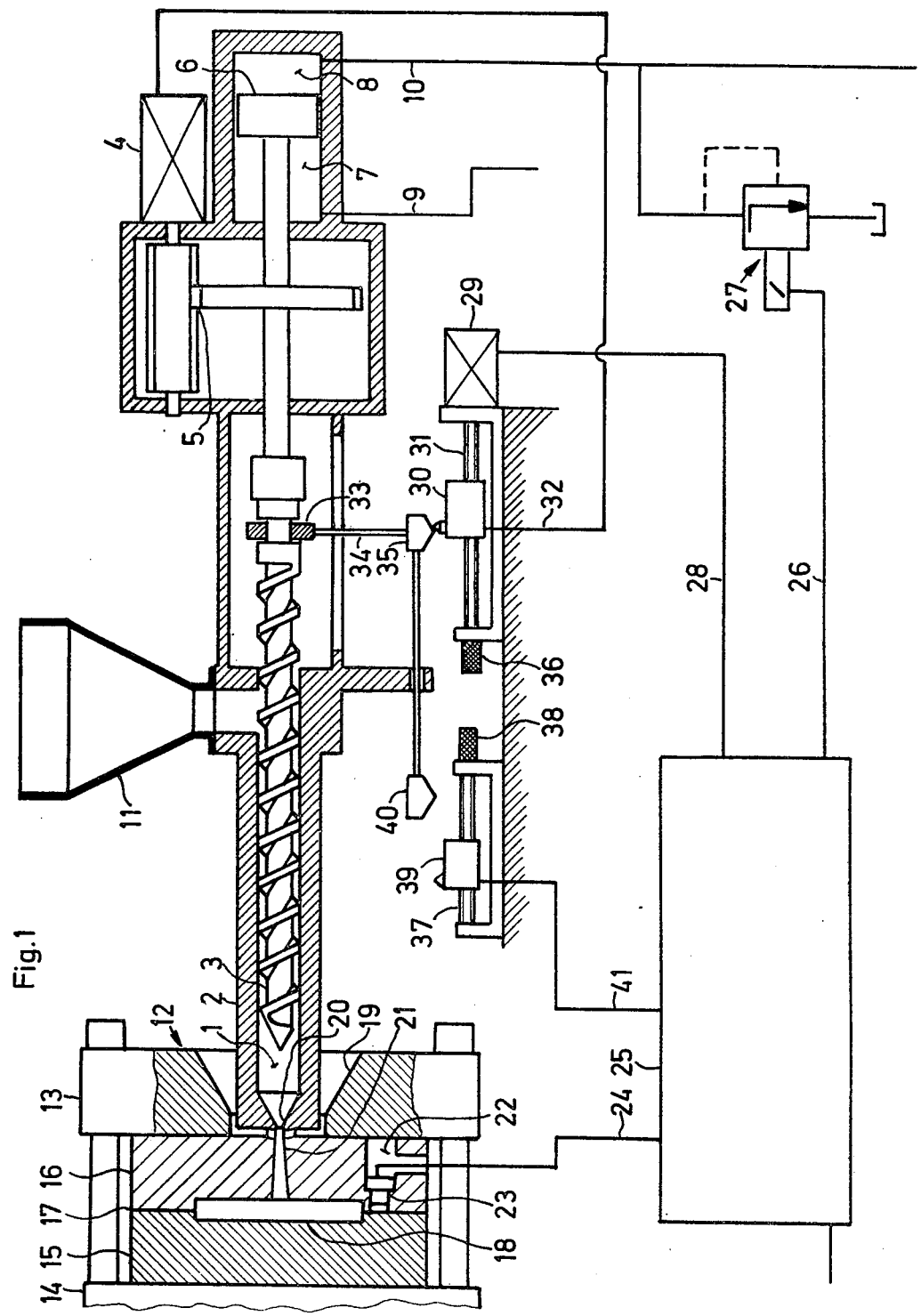
FIG. 1 is a diagrammatic view of a regulating device on a screw injection moulding machine shown in vertical section.

Referring first to FIG. 1, a plasticizing screw 3, disposed in a cylinder chamber 1 of a plasticizing cylinder 2 in the screw injection moulding machine illustrated, can be rotated by a motor 4 and via a mechanical transmission 5 for the purpose of plasticizing. The screw is moved by a hydraulic, double-acting displacer unit 6 for injecting the plasticized stock or moulding material into the mould. Two hydraulic lines 9 and 10 which extend into displacer chambers 7 and 8 of the displacer unit 6 are connected to a hydraulic source, which is not shown, and can be alternately switched by known control means to carry out forward and return displacement of the screw 3.

A mould closing unit 12 which is disposed beyond the discharge end of the plasticizing cylinder 2 is provided with a stationary mould platen 13, which is fixed on cross-members, and with a mould platen which is movable in the horizontal direction towards and away from the fixed platen by mechanical or hydraulic driving means and is guided on cross-members illustrated but not referenced. Each of the mould platens 13 and 14 supports one mould half 15 and 16 which abut flat upon each other in a mould parting plane 17 when the mould is closed and together define a mould nest 18 which forms the moulding. The plasticizing cylinder 2 extends through an opening 19 of the stationary mould platen 13 and communicates via an injection die orifice 20 with an opening leading into the mould half 16.

An inductive electromagnetic measuring transducer 23, adapted to operate without physical contact, is inserted into a bore 22 of the mould half 16 and its inductance is changed even if a very small gap indeed is formed in the mould parting plane 17. As is conventional, the two mould halves 15 and 16 are pressed against each other in the mould closing position under the effect of a closing force which acts on the moving mould platen. A stock pressure which acts against the closing pressure and therefore has the tendency to separate the two mould halves 15 and 16 in the mould parting plane 17 becomes effective in the mould nest 18 during the injection operation. The stock pressure also results in a certain amount of flexure of the mould platens 13 and 14 and this also contributes to the formation of a gap in the mould parting plane 17. The mould parting gap which occurs as a consequence results in the inductance of the transducer 23 changing. The resultant new inductance value is supplied via a lead 24 to a regulating apparatus 25 whose individual functions are not described in this context as they are not essential to the understanding of the invention.

FIG. 1 discloses two ways of evaluating the gap size as detected by the transducer 23 for regulating the shot capacity. In a first way the measured value which is fed to the regulating apparatus 25 is converted into an analog voltage value which is supplied via a conductor 26 to a magnetically controlled pressure relief valve 27 that is connected to the hydraulic line 10 which extends into the right-hand displacer chamber 8. The injection pressure which acts on the plasticizing screw 3 is defined by the pressure relief valve 27 in the right-hand displacer chamber of the displacer unit 6 in accordance with the gap dimension detected by the measuring transducer 23 in the mould parting plane 17. Pressure can be defined in the same operating cycle, the injection pressure being approximately reduced or increased simultaneously with the increase or decrease respectively of the mould parting gap.

This avoids the finished moulding having excessive flash, the removal of which would require additional labour. On the other hand the formation of flash is a clear sign indicating that the optimum filling ratio of the injection mould has been reached. An extremely thin flash, which can be easily removed from the moulding, is therefore tolerated. Accordingly, a mould parting gap of minimum size is maintained as part of the regulating function and is maintained by an appropriate increase of the injection moulding pressure should the gap dimension drop below a specified value. A preferred application of controlling the injection pressure to achieve a constant shot capacity is in the processing of thermoplastic materials because these can be injected with a stock cushion which builds up in the nozzle zone of the plasticizing cylinder.

In the second way of control the measured value of the mould parting gap which is supplied by the transducer 23 to the control apparatus 25 is converted into digital pulses which are transferred via a conductor 28 to a servomotor 29. The servomotor 29 is adapted to rotate a lead screw 31 which supports a limit switch 30. For its basic setting the limit switch 30 may also be adjusted by a rotating knob 36. A control member 33 which is fixed to move in unison with the rear end of the plasticizing screw 3 supports a trip cam 35.

The mould gap value which is measured during the injection operation by the measuring transducer 23 is converted into current pulses which turn the servomotor 29, the direction of rotation of the motor being defined by a positive or negative pulses depending on whether the mould gap is too large or too small. The control pulses which act in steps on the servomotor 29 define the position of the limit switch 30 and the motor 4 is switched off in accordance with the said position during the returning metering stroke of the plasticizing screw 3. The limit switch 30 is connected to the motor 4 by a connection 32 which enables performance of the control function. This defines the metering stroke of the plasticizing screw 3 during the succeeding plasticizing operation in accordance with the mould parting gap which is measured during the injection operation. The metering stroke defines the metering volume and therefore the shot capacity. The previously described kind of regulation of the metered volume is advantageous, more particularly when processing thermosetting plastics which require to be extruded without any residue.

It is also feasible to combine both kinds of regulation with each other, both the injection pressure as well as the metered volume being the controlled conditions. Further methods of regulating the metered volume are within the scope of the invention, for example by disengaging the rotary drive for the plasticizing screw by means of a clutch. Instead of being operated by digital pulse control the servomotor could also be actuated by an analog time control.

It is advantageous to limit the measuring and regulating time. A further limit switch 39, which can be adjusted on a traversing spindle 37 by means of a rotary knob 38, is provided to this end. The said limit switch 39 which can be actuated by a trip cam 40 provides on and off switching for the control circuit of the regulating apparatus via a control line 41.

FIRST MODIFICATION

Figure 2:
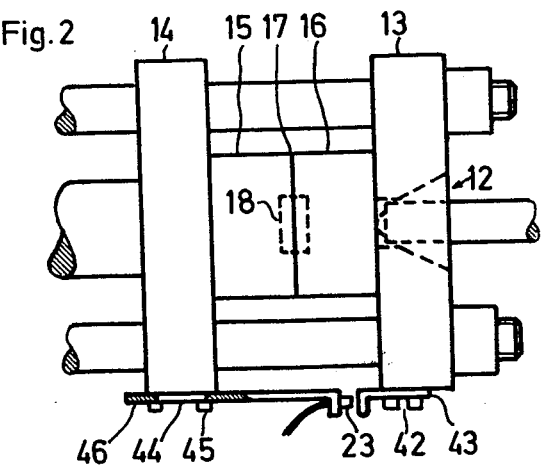
FIG. 2 is a mould closing unit of an injection moulding machine and showing one measuring position of the regulating device; and, FIG. 3 shows a further modification of the measuring position of the regulating device in a stationary mould support of the unit.

FIG. 2 in the same way as FIG. 1 relates to an identical screw injection moulding machine and also shows the mould closing unit 12 comprising a stationary mould platen 13 and a movable mould platen 14 with two mould halves 15 and 16 which enclose a mould nest 18. A contact plate 43 is detachably mounted by means of screw fasteners 42 on the stationary mould platen 13. A sliding plate 46 with a longitudinal slot 44 and mounted by means of screw fasteners 45 on the movable mould platen 14 is adapted to support the measuring transducer 23. The position of the sliding plate 46 is selected so that a very small gap remains between the measuring transducer 23 and the contact plate 43 when the moulds are closed. Any mould parting gap which is produced in the mould parting plane 17 during the injection operation is indirectly measured via the two mould platens 13 and 14 since any change of the gap between the measuring transducer 23 and the contact plate 43 remains in an unvarying relationship to the mould parting gap. The resultant measured value can be subsequently evaluated for correcting the injection pressure or the metered volume by the regulating and control element described in conjuction with the first embodiment.

SECOND MODIFICATION

Figure 3:
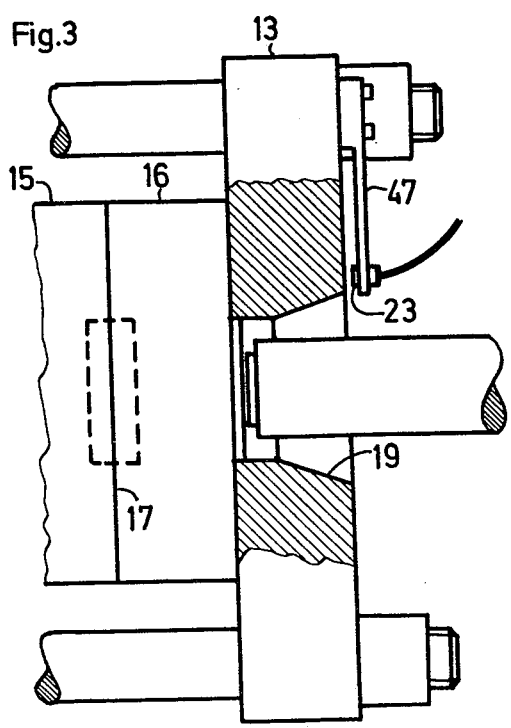

The stationary mould platen 13 of the closing unit 12, illustrated in FIG. 3 and having the same parts, is provided with a flexure plate 47 on whose free end the measuring element 23 is disposed. The mould platen 13 is subjected to maximum flexure in the zone of the aperture 19. The relatively large flexural travel is sufficient for the indication of a desired size of gap which is formed in the mould parting plane 17 as a result of the injection process. Such indirect measurement on mould platens offers the advantage of enabling the measuring device to remain on the machine when the moulds are changed.

Instead of being measured by means of an inductive measuring transducer the mould parting gap could also be measured by strain gauges which are applied to the mould or to the mould platen. The concept of measuring transducers also refers to miniature switches which come into operation when tolerance limits of the mould parting gap drop below a specified value or exceed it.

It should also be noted that factors other than the injection pressure and the metered volume but which also effect the condition of the stock may influence the injection volume. For example, it is within the scope of the invention to utilize the back pressure which acts on the plasticizing element, to utilize the injection rate, the rotational screw speed, the stock dwell period in the plasticizing cylinder or the temperature in the plasticizing cylinder or in the mould as controlled conditions for maintaining the injection volume at a constant value.

It will be understood that the regulating device according to the invention can also be applied to an injection moulding machine of plunger construction.

We claim:
1. Injection molding apparatus comprising a pair of molds defining a mold cavity and movable relative to each other to define therebetween a mold gap, injection means in communication with said mold cavity including a plasticizing screw which is both longitudinally and rotatably movable to process and inject moldable material into said mold cavity, means operatively connected to said screw for rotatively driving said screw, means operatively connected to said screw for longitudinally driving said screw, sensing means mounted on said molds for sensing said mold gap and control means operatively connected to said sensing means and responsive to said sensing means for controlling operation of said rotative driving means and said longitudinal driving means to thereby control operation of said plasticizing screw to effect injection of a controlled amount of molding material into said mold cavity in dependence upon the mold gap sensed by said sensing means, said control means including limit switch means which comprise first contact means and second contact means, said second contact means being mounted for longitudinal movement with said screw at least one of said first and said contact means being operatively connected with said rotative driving means, said first contact means being located in the path of said second contact means with said first and said second contact means thereby being engageable and disengageable in order to control said rotative driving means to start and stop rotation of said screw, said control means including means responsive to said sensing means for varying the position of said first contact means in accordance with said sensed mold gap thereby to vary the point at which said first and second contact means come into engagement with each other in order to determine the dosage of said moldable material injected into said mold cavity.

2. Apparatus according to claim 1 wherein said sensing means comprise electrical transducer means exhibiting a variable electrical characteristic in response to changes in said mold gap.

3. Apparatus according to claim 2 wherein said transducer means include means exhibiting a varying inductance in response to changes in said mold gap.

4. Apparatus according to claim 2 wherein said molding apparatus includes a pair of mold platens each fixed respectively to one of said pair of molds and arranged to undergo deformation in accordance with pressure within said mold cavity, and wherein said transducer means include means for sensing deformation in said mold platens.

5. Apparatus according to claim 1 wherein said means for longitudinally driving said screw comprise hydraulic means for applying hydraulic fluid pressure to said screw and electrically controlled valve means for controlling the level of said fluid pressure applied, said control means including means for delivering an electrical signal to said valve means in response to said sensing means for controlling said fluid pressure level in accordance with the mold gap sensed by said sensing means.

6. Apparatus according to claim 2 wherein said sensing means is mounted upon one of said molds of said pair of molds and operates to sense the relative movement between said pair of molds.

7. Apparatus according to claim 2 wherein said sensing means comprise a pair of sensing elements each mounted respectively upon one of said molds of said pair of molds and operative to sense said mold gap by sensing relative movement between said pair of molds.

* * * * *